US011492786B2

(12) United States Patent
Dufault et al.

(10) Patent No.: US 11,492,786 B2
(45) Date of Patent: Nov. 8, 2022

(54) METHOD FOR FLUID PRESSURE CONTROL IN A CLOSED SYSTEM

(71) Applicant: Graco Minnesota Inc., Minneapolis, MN (US)

(72) Inventors: Peter N. Dufault, Saint Paul, MN (US); Todd A. Anderson, Elk River, MN (US)

(73) Assignee: Graco Minnesota Inc., Minneapolis, MN (US)

(*) Notice: Subject to any disclaimer, the term of this patent is extended or adjusted under 35 U.S.C. 154(b) by 134 days.

(21) Appl. No.: 16/721,394

(22) Filed: Dec. 19, 2019

(65) Prior Publication Data

US 2020/0123742 A1 Apr. 23, 2020

Related U.S. Application Data

(62) Division of application No. 15/306,917, filed as application No. PCT/US2015/027955 on Apr. 28, 2015, now Pat. No. 10,550,552.
(Continued)

(51) Int. Cl.
*E03C 1/04* (2006.01)
*B05B 12/08* (2006.01)
(Continued)

(52) U.S. Cl.
CPC .......... *E03C 1/0408* (2013.01); *B05B 12/085* (2013.01); *B05B 12/088* (2013.01);
(Continued)

(58) Field of Classification Search
CPC .............. E03C 1/0408; G05D 16/2095; G05D 11/132; B05B 12/088; B05B 12/1418;
(Continued)

(56) References Cited

U.S. PATENT DOCUMENTS 4,019,653 A 4/1977 Scherer et al.
4,324,366 A 4/1982 Geier et al.
(Continued)

FOREIGN PATENT DOCUMENTS

CN 101622506 A 1/2010
CN 102186675 A 9/2011
(Continued)

OTHER PUBLICATIONS

First Korean Office Action for KR Application No. 10-2016-7033205, dated May 14, 2021, pp. 10.
(Continued)

*Primary Examiner* — Qingzhang Zhou
(74) *Attorney, Agent, or Firm* — Kinney & Lange, P. A.

(57) ABSTRACT

A method for controlling a system pressure within a closed system includes sending a signal to a pressure control valve corresponding to a pressure set point and actuating the pressure control valve to vary a pilot pressure of a control fluid contained within a pressure control line that is fluidly connected to a pressure regulator. A diaphragm of the pressure regulator is disposed between the pressure control line and a system line and acts on a fluid with the system line to modify the system pressure.

7 Claims, 2 Drawing Sheets

Related U.S. Application Data

(60) Provisional application No. 61/987,250, filed on May 1, 2014.

(51) Int. Cl.
*G05D 16/20* (2006.01)
*B05B 12/14* (2006.01)
*G05D 11/13* (2006.01)

(52) U.S. Cl.
CPC ........ *B05B 12/1418* (2013.01); *G05D 11/132* (2013.01); *G05D 16/2095* (2019.01)

(58) Field of Classification Search
CPC ..... B05B 12/085; B05B 12/006; B05B 12/10; B05B 12/12
See application file for complete search history.

(56) References Cited

U.S. PATENT DOCUMENTS

| | | | | |
|---|---|---|---|---|
| 4,487,367 | A | | 12/1984 | Perry et al. |
| 4,562,088 | A | | 12/1985 | Navarro |
| 4,602,653 | A | | 7/1986 | Ruiz-Vela et al. |
| 4,614,300 | A | | 9/1986 | Falcoff |
| 4,720,807 | A | | 1/1988 | Ferran et al. |
| 4,848,657 | A | | 7/1989 | Hashimoto et al. |
| 4,858,172 | A | | 8/1989 | Stern |
| 4,877,051 | A | | 10/1989 | Day |
| 5,107,441 | A | | 4/1992 | Decker |
| 5,182,704 | A | | 1/1993 | Bengtsson |
| 5,197,800 | A | | 3/1993 | Saidman et al. |
| 5,215,253 | A | | 6/1993 | Saidman et al. |
| 5,330,783 | A | | 7/1994 | Saidman et al. |
| 5,400,965 | A | * | 3/1995 | Ratnik ...................... F25C 3/04 239/14.2 |
| 5,520,333 | A | | 5/1996 | Tofte |
| 5,609,136 | A | | 3/1997 | Tuken |
| 6,112,137 | A | | 8/2000 | McCarty et al. |
| 6,149,071 | A | | 11/2000 | MacCallumMhor et al. |
| 6,223,645 | B1 | | 5/2001 | Elberson |
| 7,004,402 | B2 | | 2/2006 | Borders et al. |
| 7,114,517 | B2 | | 10/2006 | Sund et al. |
| 7,363,100 | B2 | | 4/2008 | Skelton-Becker et al. |
| 7,603,186 | B2 | | 10/2009 | Smirnov |
| 7,706,926 | B2 | | 4/2010 | Peterson |
| 7,798,167 | B2 | | 9/2010 | Ohmi et al. |
| 8,082,946 | B2 | | 12/2011 | Laverdiere et al. |
| 8,915,262 | B2 | | 12/2014 | Smirnov |
| 8,920,574 | B2 | | 12/2014 | Bhaumik et al. |
| 2004/0089234 | A1 | | 5/2004 | Hagglund et al. |
| 2004/0104244 | A1 | | 6/2004 | Cline et al. |
| 2004/0262428 | A1 | | 12/2004 | Wulteputte |
| 2008/0047611 | A1 | | 2/2008 | Sterner |
| 2008/0262650 | A1 | | 10/2008 | Dorendorf et al. |
| 2009/0194604 | A1 | | 8/2009 | Smith |
| 2012/0009329 | A1 | | 1/2012 | Mather et al. |
| 2012/0168004 | A1 | | 7/2012 | Terrier |
| 2012/0173027 | A1 | | 7/2012 | Cheng et al. |
| 2012/0203475 | A1 | | 8/2012 | Wilkens et al. |
| 2013/0146148 | A1 | | 6/2013 | Smirnov |
| 2014/0005841 | A1 | | 1/2014 | Cheng et al. |

FOREIGN PATENT DOCUMENTS

| | | | |
|---|---|---|---|
| CN | 102856570 | A | 1/2013 |
| DE | 2819302 | B2 | 12/1980 |
| DE | 3423094 | A1 | 1/1986 |
| EP | 0741349 | A2 | 6/1996 |
| EP | 1481736 | A2 | 12/2004 |
| JP | H03127655 | A | 5/1991 |
| JP | H07246359 | H | 9/1995 |
| JP | H10-303153 | A | 11/1998 |
| JP | H1-314281 | A | 11/1999 |
| JP | 200213466 | A | 8/2000 |
| JP | 2002544579 | A | 12/2002 |
| JP | 2003290709 | A | 10/2003 |
| JP | 2007503982 | A | 3/2007 |
| KR | 1020090027273 | A | 3/2009 |
| KR | 20130023156 | A | 3/2013 |
| WO | WO0234417 | A1 | 5/2002 |

OTHER PUBLICATIONS

Second Japanese Office Action for JP Application No. 2016-561270, dated Nov. 13, 2019, pp. 5.
First Chinese Office Action for CN Application No. 201580015670.3, dated May 11, 2018, pp. 7.
Extended European Search Report for EP Application No. 15785894.5, dated Nov. 28, 2017, pp. 10.
Extended European Search Report for EP Application No. 15786269.9, dated Nov. 28, 2017, pp. 5.
International Search Report and Written Opinion for PCT Application No. PCT/US2015/027919, dated Jul. 20, 2015, pp. 10.
International Search Report and Written Opinion for PCT Application No. PCT/US2015/027955, dated Jul. 27, 2015, pp. 13.
First Japanese Brief Report for JP Application No. 2016-561270, dated Mar. 27, 2019, pp. 7.
First Japanese Brief Report for JP Application No. 2016-561280, dated Apr. 10, 2019, pp. 8.
First Korean Office Action for KR Application No. 10-2016-7033206 dated May 21, 2021, pp. 4.

* cited by examiner

METHOD FOR FLUID PRESSURE CONTROL IN A CLOSED SYSTEM

CROSS-REFERENCE TO RELATED APPLICATION(S)

This application is a divisional of U.S. National Stage application Ser. No. 15/306,917 filed Oct. 26, 2016 for "METHOD FOR FLUID PRESSURE CONTROL IN A CLOSED SYSTEM", which in turn claims the benefit of PCT International Application No. PCT/US2015/027955 filed Apr. 28, 2015 for "METHOD FOR FLUID PRESSURE CONTROL IN A CLOSED SYSTEM", which in turn claims the benefit of U.S. Provisional Application No. 61/987,250 filed May 1, 2014 for "METHOD FOR FLUID PRESSURE CONTROL IN A CLOSED SYSTEM" by P. N. Dufault and T. A. Anderson.

BACKGROUND

The present invention relates generally to controlling one or more system parameters and, more particularly, to fluid pressure control within a closed system.

Industrial systems that control various system parameters (e.g. pressure, flow rate, temperature, and the like) often encounter various system disturbances. In order to maintain the system within established parameters, the control scheme for the system is designed to respond to environmental changes and variable properties of fluids or materials contained within the system. Such control systems often detect and counteract gradual changes in the system through monitoring parameters critical to system performance.

Some industrial systems utilize sprayers to dispense material (e.g. paint, adhesive, epoxy, and the like) at a specific pressure and flow rate. In some systems that operate continuously or for relatively long periods of time at a single pressure and flow rate, the pressure and flow rate reach steady state. Thus, minor changes in the material and/or system performance can be carefully monitored and counteracted by a conventional control scheme.

However, when such systems operate at multiple pressure and flow rate combinations in which some conditions operate for relatively short durations, the pressure and flow rate do not reach steady state. Pressure and flow rate changes and/or fluctuations during these transient periods within the system are problematic for control systems because conditions are different at the sprayer outlet than at measurement locations within the system. Failing to account for these transient conditions can result in over-dispensing or under-dispensing material.

In some traditional control schemes, transient periods are controlled by segregating system operating conditions and performing a calibration routine prior to performing each operation. However, calibration routines increase manufacturing costs and disrupt manufacturing work flow because production pauses during the calibration routine. In other traditional control schemes, transient periods are controlled by dispensing excess material until the system reaches steady state. Once the system is at steady state, the traditional control scheme is capable of accounting for minor disturbances. However, dispensing excess material increases material costs.

Therefore, a need exists for controlling the pressure and flow rate of an industrial system that can cost-effectively adapt to multiple operating conditions, environmental changes, and transient conditions.

SUMMARY

A method for controlling a system pressure within a closed system includes sending a signal to a pressure control valve corresponding to a pressure set point and actuating the pressure control valve to vary a pilot pressure of a control fluid contained within a pressure control line that is fluidly connected to a pressure regulator. A diaphragm of the pressure regulator is disposed between the pressure control line and a system line and acts on a fluid with the system line to modify the system pressure.

A method of varying a system pressure of a sprayer system includes actuating a spray gun to stop a flow through the sprayer system, using a controller to establish a pressure set point, sending a signal from the controller to a pressure control valve corresponding to the pressure set point, and actuating the pressure control valve to vary a pilot pressure of a control fluid within a control line that is fluidly connected to a pressure regulator. A diaphragm of the pressure regulator fluidly separates the control fluid from a fluid contained within a system line and acts on the fluid to vary the system pressure.

DETAILED DESCRIPTION

Figure 1:
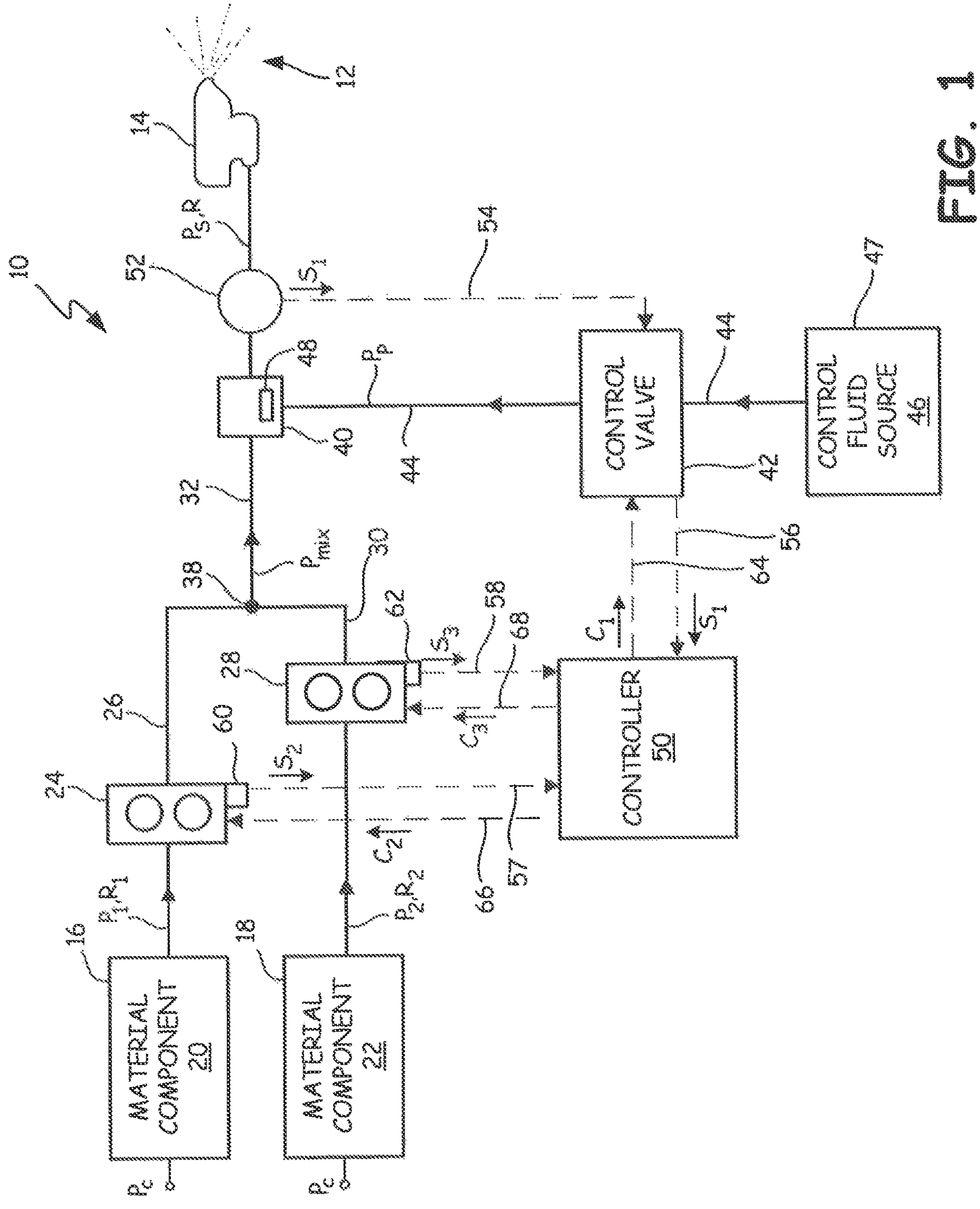
FIG. 1 is a schematic diagram showing an industrial sprayer system.

FIG. 1 is a schematic diagram of industrial system 10 for dispensing mixed material 12 from sprayer 14, such as a passive proportioner system. Industrial system 10 includes, among other components described hereafter, material supply systems 16 and 18, which contain material components 20 and 22, respectively. Material supply system 16 is fluidly connected to meter 24 with supply line 26, and material supply system 18 is fluidly connected to meter 28 with supply line 30. Material supply system 16 acts on material component 20 to increase its pressure from initial pressure P0 to supply pressure P1. Similarly, material supply system 18 acts on material component 22 to increase its pressure from initial pressure P0 to supply pressure P2. Material supply systems 16 and 18 can be pressurized tanks containing material components 20 and 22, respectively. Alternatively, material supply systems 16 and 18 can include feed pumps or other circulating components that act on material components 20 and 22, respectively. As such, initial pressure P0 can range from ambient pressure (0 kPa gage) to a pressure suitable for supplying material components 20 and 22, typically no greater than 2068 kPa gage (300 psig). Additionally, initial pressure P0 for material supply system 16 does not necessarily equal initial pressure P0 for material supply system 18. For instance, initial pressures P0 can be tailored to the material properties of material components 20 and 22. Meters 24 and 28 are disposed along supply lines 26 and 30, respectively. Supply lines 26 and 30 fluidly connect material supply systems 16 and 18, respectively, to mixed material line 32 at junction 38 where supply lines 26 and 30 join. Mixed material line 32 fluidly connects supply lines 26 and 30 at junction 38 to spray gun 14. Meters 24 and 28 are arranged in parallel and cooperate to supply material components 20 and 22 to mixed material line 32 where components 20 and 22 combine to form mixed material 12 having mixed pressure Pmix. Meters 24 and 28 supply mixed material 12 to sprayer 14 at flow rate R where it is selectively dispensed.

Pressure regulator 40 is disposed along mixed material line 32 to reduce mixed pressure Pmix to system pressure Ps prior to dispensing mixed material 12 from spray gun 14. Adjustment of system pressure Ps is accomplished by using control valve 42 to vary pilot pressure Pp. Control valve 42 is disposed along control pressure line 44, which contains control fluid 46 and extends from control fluid source 47 to pressure regulator 40. Control fluid 46 acts on diaphragm 48 of pressure regulator 40 to modify system pressure Ps when system 10 is in a closed state. An increase in pilot pressure Pp increases system pressure Ps due to force application of diaphragm 48 on mixed material 12. A decrease of pilot pressure Pp decreases system pressure Ps due to a force reduction from diaphragm 48 on mixed material 12. When diaphragm 48 reduces force applied to mixed material 12, it acts on control fluid 46. Pilot pressure Pp of control fluid 46 is maintained by allowing a portion of control fluid 46 to return to control fluid source 47. In some embodiments, pressure regulator 40 is an air-operated, low flow pressure regulator.

System pressure Ps and flow rate R are managed by controller 50. Pressure transducer 52 disposed downstream from pressure regulator 40 produces signal 51, which is a voltage or current of pressure transducer 52. Signal line 54 electrically connects pressure transducer 52 to control valve 42, and signal line 56 electrically connects control valve 42 to controller 50, each signal line transmitting signal 51 to controller 50. Signal lines 57 and 58 electrically connect flow rate sensors 60 and 62 to controller 50, respectively. Flow rate sensor 60 detects flow rate R1 flowing through meter 24, and flow rate sensor 62 detects flow rate R2 flowing through meter 28. Flow rates R1 and R2 are transmitted to controller 50 in the form of signals S2 and S3, respectively, which like signal 51, are voltage or currents from sensors 60 and 62, respectively. Based on values of signals 51, S2, and S3, controller 50 executes a controlling scheme to modify flow rates R1 and R2 flowing through meters 24 and 28, respectively, and to modify system pressure Ps by commanding control valve 42 to change pilot pressure Pp. Material component 20, flowing at flow rate R1, combines with material component 22, flowing at flow rate R2, within mixed material line 32 to produce mixed material 12, flowing at flow rate R. Controller 50 modifies pilot pressure Pp by sending control signal C1 to control valve 42 with control line 64 and modifies flow rates R2 and R3 by sending control signals C2 and C3 to meters 24 and 28 with control lines 66 and 68, respectively.

Transient conditions exist within system 10 when actuating spray gun 14 to close system 10, which is typically accomplished with an air-actuated solenoid valve (not shown in FIG. 1) or a trigger of spray gun 14 (not shown in FIG. 1). Because flow rates are measured at meters 24 and 28 and not at spray gun 14, changes of system pressure Ps and flow rate R lag changes to pilot pressure Pp and flow rates R1 and R2. If controller 50 causes pressure regulator 40 to maintain a constant system pressure Ps when system 10 is closed, then the pressure at spray gun 14 increases due to the lack of flow-based pressure drop within system 10. Subsequently, when system 10 is opened (i.e. from opening the solenoid valve or trigger within spray gun 14), a burst of flow, driven by the prior pressure increase, causes non-uniform application of mixed material 12. If controller 50 causes pressure regulator 40 to increase system pressure Ps while system 10 is closed, then effects from a burst flow are amplified. When controller 50 causes system pressure Ps to decrease while system 10 is closed, hysteresis effects increase the error between the target pressure and system pressure Ps. The resulting system pressure Ps will not dispense mixed material 12 from spray gun 14 at the desired flow rate R.

Moreover, material property and/or environmental changes impact system pressure Ps and flow rate R during operation. For example, material components 20 and 22, respectively, are periodically replenished. Because newly added material components 20 and 22 can have different temperatures from each other and from the previously dispensed materials, properties such as viscosity can affect flow rate R as supplied to sprayer 14. Additionally, mixed material 12 can partially cure within mixed material line 32 and, over time, foul mixed material line 32. As such, mixed material line 32 is periodically cleaned with solvents. Environmental changes such as ambient temperature and humidity changes also affect the properties of material components 20 and 22. However, system 10 is designed to operate over a range of system pressures Ps and a range of flow rates R, each operating condition having duration.

Some spraying applications involve several discrete operating conditions. For example, three operating conditions could be used in sequential order: 1) dispense 100 cc/min at 68.9 kPA (about 10 psi) for 10 seconds, 2) dispense 200 cc/min at 137.9 kPa (about 20 psi) for 15 seconds, and 3) dispense 50 cc/min at 34.5 (about 5 psi) for 2 seconds. Without the aid of method 70 described below, the transient conditions of system 10 are counteracted by performing repeated calibration procedures and/or by discharging mixed material 12 between operating points until steady state conditions are present within system 10. Both methods result in additional manufacturing costs and/or wasted mixed material 12. However, method 70 as described below regulates system pressure Ps to the target pressure while system 10 is closed while actively compensating for hysteresis within system 10 and pressure regulator 40. Additionally, method 70 can optionally regulate system pressure Ps to a target pressure that is offset to counteract the initial pressure drop within system 10 when spray gun 14 is opened.

Figure 2:
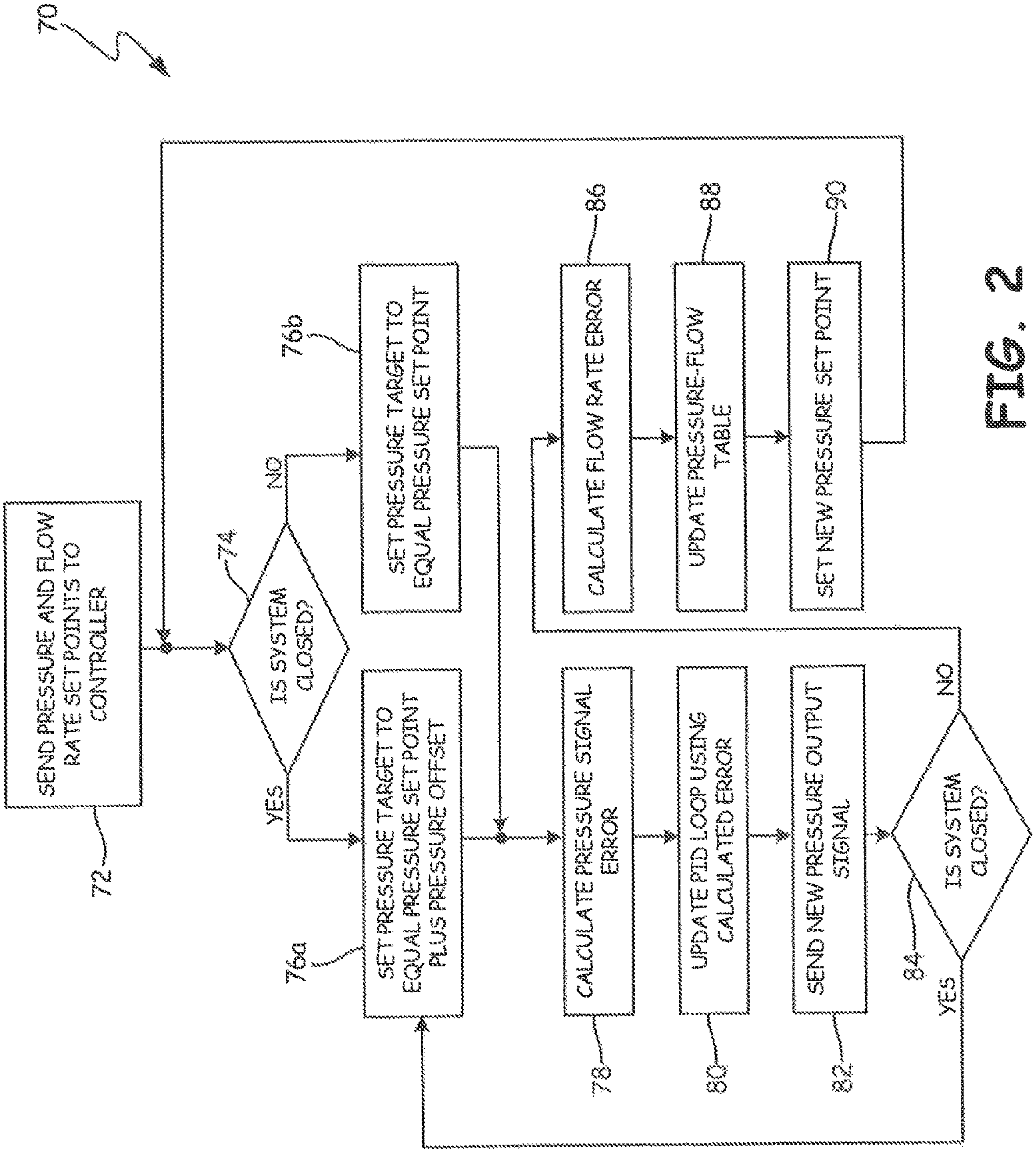
FIG. 2 is a flow chart showing a method for controlling a pressure of the industrial sprayer system in FIG. 1.

FIG. 2 is a flow chart showing method 70 of controlling system pressure Ps within a closed system (i.e., system 10 between operating conditions). Method 70 includes step 72 and the subsequent steps as described below.

Step 72 includes selecting and sending a pressure set point and a flow rate set point to controller 50. The specific pressure and flow rate set points are determined based on the requirements of mixed material 12, for instance, as explained in the previously described example.

In step 74, controller 50 determines the state (e.g., closed or open) of system 10. The controller can make this determination by receiving signals that communicate the position of the trigger or solenoid valve of spray gun 14. If system 10 is closed, step **76*a* is performed. Step 76*a* establishes a target pressure at spray gun 14 that is equal to the pressure set point plus a pressure offset. The pressure offset is selected to offset the effects of increasing or decreasing the pressure set point relative to the previously selected set point, as previously described above. Optionally, the pressure offset can also counteract the initial pressure drop within system 10 when spray gun 14 is opened. If system 10 is open, step 76*b* is performed. Because spray gun 14 dispenses mixed material 12 when system 10 is open, offsetting the target pressure is not necessary. Thus, step 76***b* establishes a target pressure equal to the pressure set point.

After establishing a target pressure, step 78 involves calculating the pressure signal error. The pressure signal error is determined by receiving signal 51 from pressure transducer 52 at controller 50 and comparing signal 51 to the target pressure. The difference between signal 51 and the target pressure is the pressure signal error, which is stored over time in controller 50.

In step 80, the pressure signal error is used to update the PID loop. Proportional-integral-derivative loops or PID loops are known in the art. Updating the PID loop involves adding the current signal error to a data set of prior collected pressure signal error values. Next, the accumulated pressure signal error values along with parameters inputted into the controller while tuning the controller initially are used to create a new pressure output signal C1. Output signal C1 is transmitted to control valve 42 in step 82.

In step 82, output signal C1 causes control valve 42 to increase or decrease pilot pressure Pp thereby changing system pressure Ps using pressure regulator 40. For example, if the pressure signal error indicates that the pressure target is less than current system pressure Ps, then controller 50 will transmit signal C1 commanding control valve 42 to increase pilot pressure Pp. Conversely, if the error indicates that the target pressure is greater than current system pressure Ps, then controller 50 will transmit signal C2 commanding control valve 42 to decrease pilot pressure Pp.

Following step 82 is step 84 in which controller 50 determines the state of system 10 for a second time. The manner in which controller 50 determines the state of system 10 is substantially similar to step 74. If system 10 is closed, steps 76*a*, 78, 80 and 82 are repeated. If system 10 is open, controller 50 performs steps 86, 88, and 90.

Step 86 involves calculating the flow rate error within system 10. Controller 50 receives signals S2 and S3 from sensors 60 and 62 located on meters 24 and 28, respectively. The current flow rate R within system 10 is equal to the flow rates R1 and R2 flowing through meters 24 and 28, respectively. In other embodiments of system 10, a single meter (e.g., meter 24) can be used or additional meters (not shown) can be used depending on the number of components used to form mixed material 12. In each case, flow rate R dispensed from spray gun 14 is equal to the summation of each component flowing through one or more meters included in system 10. To determine the flow rate signal error, controller 50 compares the flow rate set point to the total flow rate R of system 10. The flow rate signal error is the difference between the flow rate set point and flow rate R. Using the flow rate signal error, controller 50 updates a pressure-flow table in step 88 and determines a new pressure set point in step 90. The pressure-flow table is stored within controller 50 and relates system pressure Ps to flow rate R for a specific mixed material 12. Following step 90, steps 74, 76*a* or 76*b*, 78, 80 and 82 are repeated until the state of system 10 is open in step 84.

Although the present invention has been described with reference to preferred embodiments, workers skilled in the art will recognize that changes may be made in form and detail without departing from the spirit and scope of the invention.

The invention claimed is:

1. A method of varying a system pressure of a sprayer system used to discharge a fluid includes:

sensing, by a controller, an open state or a closed state of a sprayer system, wherein the sprayer system discharges fluid in the open state, and wherein the sprayer system does not discharge fluid in the closed state; and setting, by the controller, a first target pressure of the sprayer system based on the open state or the closed state of the sprayer system, wherein:

if the sprayer system is in the open state, the controller sets the first target pressure to equal a pressure set point of the sprayer system corresponding to a first flow rate of the fluid; and if the sprayer system is in the closed state, the controller sets the first target pressure to equal a summation of the first pressure set point and a first pressure offset.

2. The method of claim 1, and further comprising:

selecting the first pressure offset to counteract a system pressure change resulting from the absence of fluid flow within the sprayer system in the closed state at the first target pressure.

3. The method of claim 1, and further comprising:

setting a second target pressure different from the first target pressure, wherein:

if the sprayer system is in the open state, the second target pressure equals a second pressure set point of the sprayer system corresponding to a second flow rate of fluid that is different than the first flow rate; and if the sprayer system is in the closed state, the second target pressure equals a summation of the second pressure set point and a second pressure offset.

4. The method of claim 3, wherein the second pressure offset is greater than the first pressure offset.

5. The method of claim 3, wherein the second pressure offset is less than the first pressure offset.

6. The method of claim 1, wherein the first pressure set point corresponds to a system pressure at a pressure regulator upstream from a spray nozzle from which fluid discharges from the system in the open state and downstream from a fluid pump.

7. The method of claim 3, and further comprising:

selecting the second pressure offset to counteract a system pressure change resulting from the absence of fluid flow within the sprayer system in the closed state and at the second target pressure, wherein the second pressure offset is different than the first pressure offset.

* * * * *

UNITED STATES PATENT AND TRADEMARK OFFICE

CERTIFICATE OF CORRECTION

PATENT NO. : 11,492,786 B2
APPLICATION NO. : 16/721394
DATED : November 8, 2022
INVENTOR(S) : Peter N. Dufault and Todd A. Anderson It is certified that error appears in the above-identified patent and that said Letters Patent is hereby corrected as shown below:

In the Specification

Column 3, Line 28:
Delete "51"
Insert --S1--

Column 3, Line 32:
Delete "51"
Insert --S1--

Column 3, Line 39:
Delete "51"
Insert --S1--

Column 3, Line 41:
Delete "51"
Insert --S1--

Column 5, Line 5:
Delete "51"
Insert --S1--

Column 5, Line 6:
Delete "51"
Insert --S1--

Column 5, Line 7:
Delete "51"
Insert --S1--

Signed and Sealed this
Nineteenth Day of December, 2023

Katherine Kelly Vidal

Katherine Kelly Vidal
*Director of the United States Patent and Trademark Office*